US008935676B2

(12) United States Patent
Verbest

(10) Patent No.: US 8,935,676 B2
(45) Date of Patent: Jan. 13, 2015

(54) AUTOMATED TEST FAILURE TROUBLESHOOTER

(75) Inventor: Guy Verbest, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 600 days.

(21) Appl. No.: 13/204,691

(22) Filed: Aug. 7, 2011

(65) Prior Publication Data

US 2013/0036405 A1 Feb. 7, 2013

(51) Int. Cl.
*G06F 9/44* (2006.01)
*G06F 9/45* (2006.01)
*G06F 11/00* (2006.01)
*G06F 11/36* (2006.01)

(52) U.S. Cl.
CPC .................................. *G06F 11/3672* (2013.01)
USPC ............. 717/131; 717/124; 717/143; 714/35; 714/39

(58) Field of Classification Search
CPC ............ G06F 11/3466; G06F 11/3688; G06F 11/3664; G06F 11/3409; G06F 11/3684; G06F 11/362; G06F 11/3672; G06F 11/3419; G06F 11/3476; G06F 2201/865; G06F 11/3636; G06F 11/3612; G06F 11/3668; G06F 11/3692; G06F 11/0775; G06F 8/427; G06F 8/41; G06F 8/443; G06F 17/2725
See application file for complete search history.

(56) References Cited

U.S. PATENT DOCUMENTS 5,204,956 A * 4/1993 Danuser et al. .............. 714/47.1
7,516,362 B2 4/2009 Connelly et al.
7,596,778 B2 9/2009 Kolawa et al.
7,836,346 B1 * 11/2010 Davidov et al. .............. 714/38.1
8,234,524 B1 * 7/2012 Smith .............................. 714/35
8,375,370 B2 * 2/2013 Chaar et al. .................... 717/124
8,381,193 B2 * 2/2013 Cervantes ...................... 717/131
2001/0014958 A1 * 8/2001 Yamauchi et al. .............. 714/38
2004/0031024 A1 * 2/2004 Fairweather .................. 717/143
2004/0066747 A1 4/2004 Jorgensen et al.
2004/0199828 A1 * 10/2004 Cabezas et al. ................. 714/39
2004/0225927 A1 * 11/2004 Warpenburg et al. ........... 714/47
2005/0166094 A1 7/2005 Blackwell et al.
2005/0251792 A1 * 11/2005 Smith ........................... 717/131
2007/0260931 A1 * 11/2007 Aguilar-Macias et al. ..... 714/39
2008/0270998 A1 * 10/2008 Zambrana ..................... 717/131

(Continued)

OTHER PUBLICATIONS

Hai Huang et al.; PDA: A Tool for Automated Problem Determination; 2007; retrieved online on Oct. 21, 2014; pp. 153-166; Retrieved from the Internet: <URL: https://www.usenix.org/legacy/events/lisa07/tech/full_papers/huang/huang.pdf>.*

(Continued)

*Primary Examiner* — Thuy Dao
*Assistant Examiner* — Hanh T Bui
(74) *Attorney, Agent, or Firm* — Law office of Clifton L. Anderson; Clifton L. Anderson

(57) ABSTRACT

A test controller performs a test of a test-target component of a test-target system so as to generate at least one fail event indicating a possible fault in the test-target component. A trouble-shooting and analysis tool probes the test controller and/or hardware of the test-target system to investigate potential causes of the fail event other than a fault of said software component. The trouble-shooting and analysis tool then analyzes fail data including probe data to evaluate potential causes of the fail event.

13 Claims, 3 Drawing Sheets

(56) References Cited

U.S. PATENT DOCUMENTS

| | | | | |
|---|---|---|---|---|
| 2009/0089764 | A1 * | 4/2009 | Lai et al. | 717/143 |
| 2009/0196186 | A1 * | 8/2009 | Lidstrom et al. | 370/241 |
| 2009/0265695 | A1 * | 10/2009 | Karino | 717/131 |
| 2010/0107143 | A1 * | 4/2010 | Emberling | 717/128 |
| 2010/0325619 | A1 * | 12/2010 | Song et al. | 717/143 |

OTHER PUBLICATIONS

Thomas Kunz and Michiel F.H. Seuren; Fast Detection of Communication Patterns in Distributed Executions; Nov. 1997; retrieved online on Oct. 21, 2014; pp. 1-13; Retrieved from the Internet: <URL: http://delivery.acm.org/10.1145/790000/782022/p12-kunz.pdf?ip=151.207.250.51>.*

Jane Cleland-Huang et al.; Event-Based Traceability for Managing Evolutionary Change; IEEE; Sep. 2003; retrieved online on Oct. 21, 2014; pp. 796-810; Retrieved from the Internet: <URL: http://ieeexplore.ieee.org/stamp/stamp.jsp?tp=&arnumber=1232285>.*

Derby Associates Internations, "13. Shop Floor Repair (REX)—Rework Management", http://www.derby.com/Derby%20Software/Products%20-%20Softimare/SFRepair/SFRepair.htm.

(Continued from above) Jan. 17, 2011.

* cited by examiner

AUTOMATED TEST FAILURE TROUBLESHOOTER

BACKGROUND

Enterprise software can include thousands of components. During development, each of these components may undergo a series of revisions or "builds". Each revision introduces a possibility of a new error or incompatibility. Automated testing procedures are available to discover software errors and incompatibilities. When automated test procedures detect failures, trouble-shooting and analysis procedures can be used to help identify the error, incompatibility or other cause of the failure. The results of trouble-shooting and analysis procedures can help guide further development of the software components.

BRIEF DESCRIPTION OF THE DRAWINGS

The following figures represent examples and not the invention itself.

DETAILED DESCRIPTION

Figure 1:
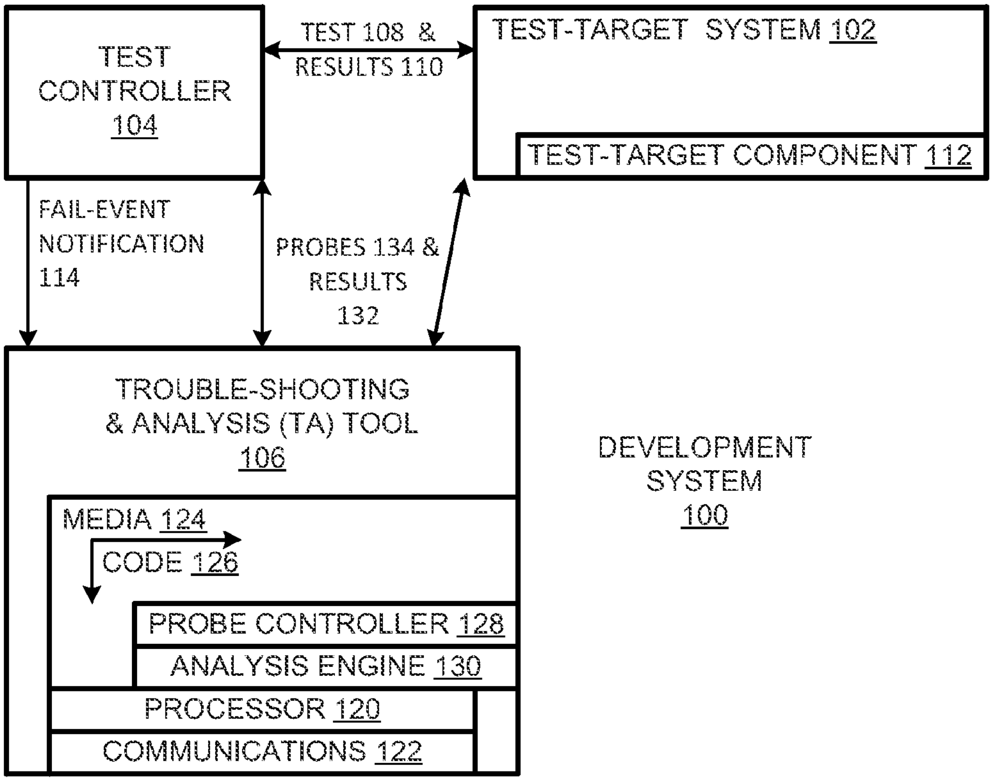
FIG. 1 is a schematic diagram of a system in accordance with a first example.

A software development system 100 includes a test-target system 102, a test controller 104, and a trouble-shooting and analysis (TA) tool 106, as shown in FIG. 1. Test controller 104 applies tests to and receives results 110 from a hardware and/or software component 112 of test-target system 102. Results 110 can include a fail event, in which case, test controller 104 provides a fail-event notification 114 to TA tool 106.

Figure 2:
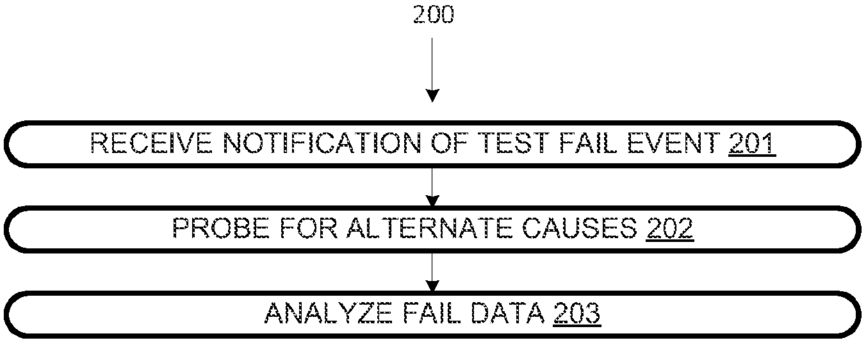
FIG. 2 is a flow chart of a process implemented by the system of FIG. 1.

TA tool 106 includes a processor 120, communication devices 122, and computer-readable storage media 124. Media 124 is encoded with code 126 that can be executed by processor 120 to define a probe controller 128 and an analysis engine 130. TA tool 106 implements a process 200, flow charted in FIG. 2. When TA tool 106 receives fail-event notification 114 via communication devices 122 at 201, probe controller 128 generates probes 134 at 202 to investigate causes for the fail event that may include a fault of target software component 112 as well as causes other than a fault of target software component 112. At 203, analysis engine analyzes fail data including probe results data 132 to evaluate potential causes of the fail event.

As process 200 occurs automatically, i.e., without human intervention, in response to notification of a fail event, considerable human effort and time are saved. TA tool 106 allows investigation of a fail event to begin without waiting for human intervention and significantly reduces the amount of engineer time required for the analysis process. TA tool 106 allows engineers to focus their time and energy once they have a complete set of data, along with some analysis about the probable cause. This provides the engineer with a concrete "head start" in troubleshooting the issue and in turn enables the engineer to be more productive and potentially attend to additional troubleshooting tasks.

Industry-wide, the number of automated tests being executed and, thus, the number of test failures, continues to grow. With hundreds of automated tests generating failures, the review and diagnosis of each failure can be time consuming and labor intensive, especially when this must be done manually. TA tool 106 shortens the turnaround time for debugging test failures and resolving issues by providing the engineers with a packaged set of relevant, meaningful and actionable data almost immediately after receiving notification of the automated test failure. Finally, the number of issues that can be resolved faster thanks to the better initial diagnosis and shortened turnaround time helps to eliminate more defects and, in turn, deliver a higher quality software product.

A test controller and a TA tool can be located on the same computer or on different computers. Either one can be located on a single computer or distributed among plural computers. Fail data can include failure-event data, test-target-system data, (test-target system and, test-controller) probe data, and historical data. Fail-event data includes data generated, e.g., on the test-target system and/or test controller, in connection with a failure event. Such data is typically found in log files on the test-target system and on the test controller.

Test-target system data includes other data related to the current state of the test-target system. For example, test-target data can include the current revision numbers and dates for components under test and other components that interact with a component under test. Historical data can include data relating to outcomes of previous tests or test operations. Such historical data can put the current failure event in context and help identify a cause.

While a fail event may be due to a fault of a target software component, it may also be due to a fault in a related software component, a fault in a hardware component of the test system, or a problem with the test controller or other external system (e.g., a connection between the test-controller and the test system or in a network directory server relied on by the test system or test controller). For example, a test fault may be due to a disk-full error on a test controller. Test probes can be used to check for a range of possible problems; probe result data can be used to exclude or identify as likely causes of the fail event factors including a fault of the target software component being tested as well as alternate causes.

Figure 3:
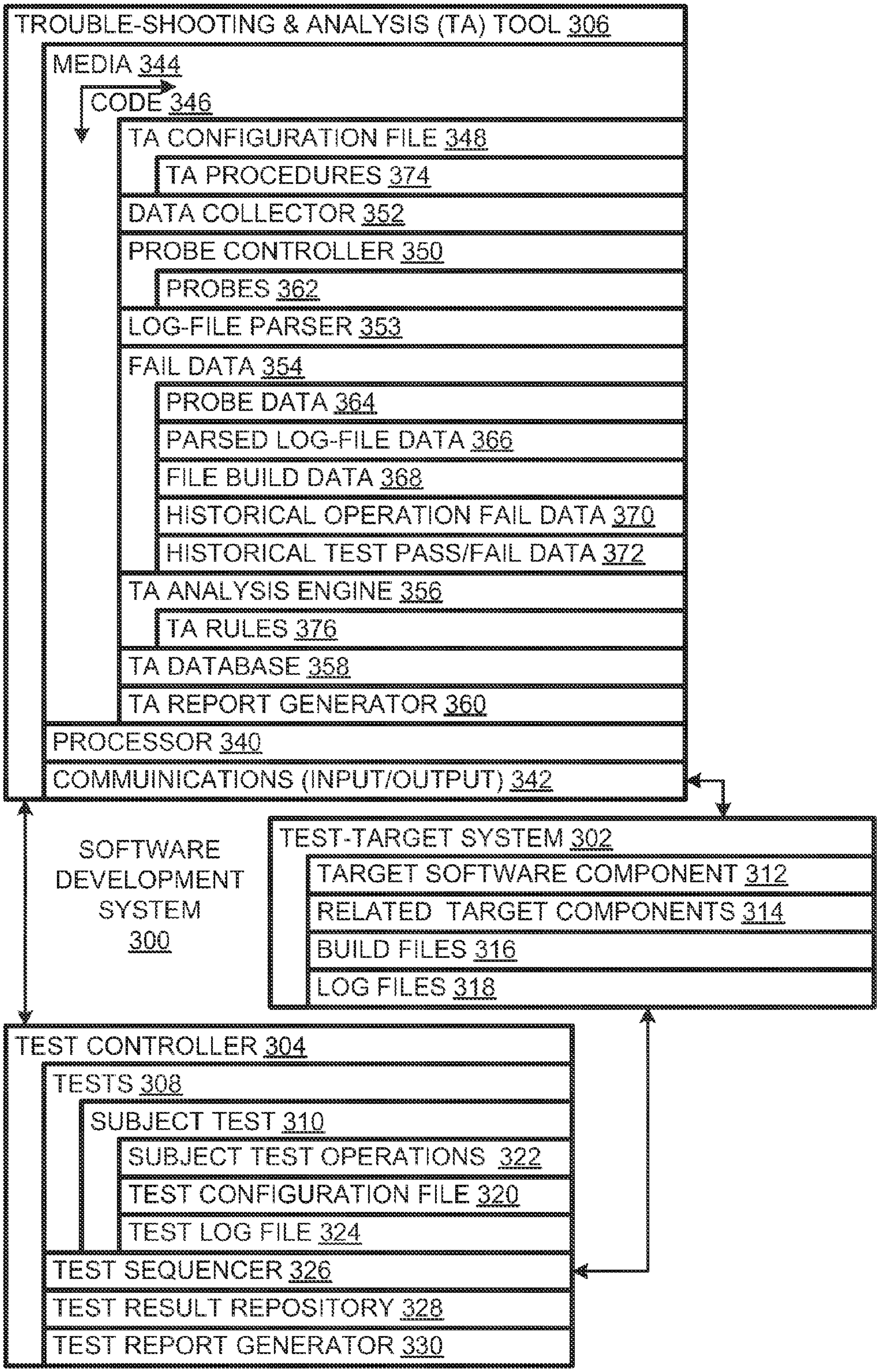
FIG. 3 is a schematic diagram of a system in accordance with a second example.

Further features may be understood in the context of software development system 300, shown in FIG. 3. Software development system 300 includes a test-target system 302, a test controller 304, and a trouble-shooting and analysis (TA) tool 306. Test controller 304 hosts a battery of automated tests 308 for testing software components of test-target system 302. A subject test 310 of tests 308 is designed for testing a target software component 312 of target-test system 302, which can include related target components 314 that may be targeted by others of tests 308.

Related components 314 can include hardware devices, computers, and networks, as well as software programs, and systems of distributed or non-distributed programs, and various combinations of hardware and software components. Some of related target components 314 can serve as inputs and outputs for target software component 312. Test-target system 302 includes build files 316, including executable program files, configuration files and other non-executable program files. In addition, test-target system 302 includes log-files 318 which store data regarding events occurring on test-target system 302 in association with their times of occurrence.

Hardware-and-software-based test controller 304 includes test configuration files that specify the test operations to be performed with each test; for example, test controller 304 includes a configuration file 320 specifying the test operations 322 that constitute subject test 310. Test controller 304 also maintains log files for storing test results, e.g., log file 324 stores results for subject test 310. A test sequencer 326 schedules and implements tests 308 so that different components of test-target system 302 can be tested at different times. Test results are initially stored in log files and then in a historical test-result repository 328. As tests are repeated, e.g., periodically, results from each run of each test are stored in test-result repository 328. A test report generator 330 provides human-readable reports and sends notifications of test fails.

TA tool 306 includes a processor 340, communication devices 342, and non-transitory computer-readable storage media 344. Media 344 is encoded with code 346 including data and instructions to be executed by processor 340. Code 346 constitutes a TA configuration file 348, probe controller 350, a data collector 352, log-file parser 353, fail data 354, TA analysis engine 356, a TA database 358, and a TA report generator 360. Configuration file 348, which is typically prepared by an engineer responsible for the test, specifies procedures to be followed upon notification of a fail event.

Probe controller 350 transmits probes 362. Some of probes 362 are used to investigate potential causes of a fail event associated with the target software component 312; some of probes 362 are used to test other components to investigate potential causes of a fail event other than a fault of target software component 312. For example, the state of test system 302 or test controller 304 (e.g., unresponsive, no disk space available, system resources exhausted, no network response, etc.), and other information which can assist in the root cause identification process.

Accordingly probes 362 can be transmitted to test controller 304 and to hardware and software components of target-test system 302 other than target software component 312. For example, probe controller 350 can send a probe 362 to test controller 304 so as to determine whether the fail event might be due to a network connectivity problem to implement subject test 310 properly. Likewise, a probe 362 can be sent to test-target system 302 to see if a hard disk with too little free space might have caused the fail event.

Data collector 352 collects fail data 354, including probe data 364 resulting from probes 362. Data collector 352 also gathers log files 318 and 324, which log-file parser 353 parses to identify test operations, test failures, and errors corresponding to fail events. The resulting parsed log-file data 366 is then collected by data collector 352. Data collector 352 collects file build data including file names, build numbers and build dates. File build data 368 can help identify changes in software component 312 and related components 314 that might have caused or contributed to the failed event.

Data collector 352 can collect historical operation fail data 370 from TA database 358. Operation fail data 370 can indicate for an operation (e.g., identified by log-file parser 353) a degree to which that operation may have been associated with past fail events; this in turn can be used, for example, to confirm or disconfirm that a fail event is associated with a particular build. If there are no past fails associated with an operation, this is also noted and reported.

Data collector 352 can collect historical test pass/fail data 372 from test-result repository 328. Historical test pass/fail data 372 can be used to identify trends that may, for example, in turn help identify possible causes of a fail event including test controller faults, faults due to components of test-target system 302 other than target software component 312, and other external causes (e.g., a fault in an external file-transfer protocol (ftp) directory server used by test-target system 302).

Once all fail data 354 has been collected for a fail event, TA analysis engine 356 can analyze the data by applying rules 376. Rules 376 can include rules in the form of if-then statements, e.g., "If fail-event equals no output from target component 312, check network connection". Rules 376 can be specified in a separate XML file associated with TA analysis engine 356. The XML or other configuration file can be updated to reflect new understandings on the part of engineers regarding potential causes for various fail-event types. In an embodiment, rules are updated automatically according to a performance history of analysis engine results.

Once a cause of a fail event is determined or possible causes are identified by analysis engine 356, report generator 360 can generate and transmit a report of the analysis results to a human engineer. The engineer can make corrections to address and potentially resolve the cause of the fail event. Depending on the fail event and analysis results, the corrective action can include correcting a bug in target component 312 or other components 314, clearing space on a full disk, replacing or routing around defective hardware, etc. If the fail event reoccurs after a presumed correction, this may suggest revisions to TA procedures 374 and TA rules 376.

Figure 4:
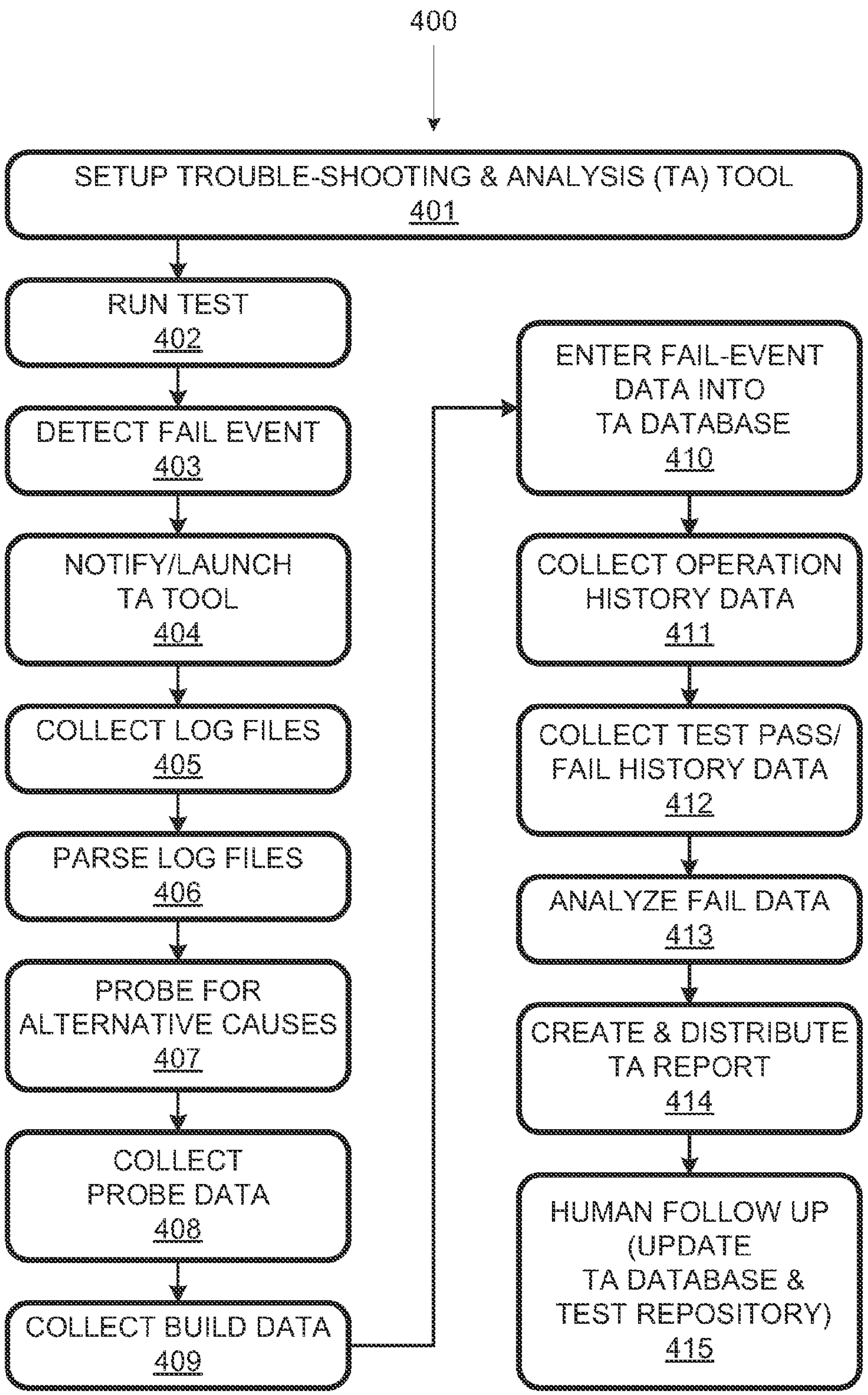
FIG. 4 is a flow chart of a process implemented the system of FIG. 3.

A process 400, implemented at least in part by TA tool 306, is flow charted in FIG. 4. At 401, TA tool 306 is set up. The setup can involve specifying procedures 374 to be followed by TA tool 306 in response to receipt of a notification of a fail event. TA tool 306 can be programmed, e.g., by creating or modifying configuration file 348, so that a single procedure is followed, regardless of the fail-event type. Alternatively, configuration file 348 can map different fail-event types to different procedures. In addition, rules 376 for analyzing fail data can be set up in a separate XML or other configuration file for the analysis engine. TA tool 306 may be easily extended by modifying procedures 374 and rules 376, e.g., in response to recognition of additional problematic areas and/or conditions.

At 402, an instance of a test is run. This involves causing known inputs to be made to target software component 312, collecting the resulting outputs, and comparing them with expected outputs. Depending on the test, mismatches between expected and actual outputs may be considered fail events, for example. In the course of the test, test controller 304 may detect a fail event at 403.

In the case it detects a fail event, test controller 304 notifies TA tool 306 of the fail event at 404. The notification can identify the test, the test operation, the time, and the nature of the failure. If there are multiple fail events, the order of failed operations will be conserved to assist engineers in understanding which problems occurred and in which order, as initial fail events can often trigger follow-on fail events. A notification can take the form of a message to a TA tool that is already executing. In some cases, the notification takes the form of launching a TA tool that is dormant by default.

At 405, in response to the notification, log files are collected. These log files include test-system log files 318 and may also include test controller log files 324. The log files that are to be collected are specified in TA configuration file 348 for test controller 304, test-target system 302, and possibly other external systems. At 406, the collected log files are parsed to determine the specific operation or operations associated with the fail event. The data returned from the log files (e.g., regarding specific failed operations) is written into TA tool database 358. Also entered into TA tool database 358 are the date and time of the failure and other important identifying information such as the specific test that was being executed, configuration info, etc.

At 407, probe controller 350 probes test system 302 and/or controller system 304 in part to gather additional data about the test run during which the fail-event occurred. This probe data can be used to provide further information that might associate the fail event with a fault in target software component 312; also, the probe data can investigate alternate potential causes of the fail event, e.g., related or other software components, hardware components of test-target system 302, problems with test controller 304, or other external causes. Data collector 352 collects the resulting probe data 364 at 408.

At 409, data collector 352 captures date and time stamps of target system build files 316 (identified as "pertinent" for target software component 312 in TA configuration file 348) to determine when the pertinent build files were last checked into source control. In this way, TA tool 306 can thus alert an engineer regarding any new code change that may be potentially contributing to the test fail. At 410, the failure data generated at 407 and collected at 405, 408, and 409, is written to TA database 358 in association with the identity of the test in which the fail event occurred and the date and time of the fail event.

At 411, data collector 352 searches TA database 358 to determine whether or not any of the operations identified at 406 corresponds to a previous fail event (e.g., from a previous run of subject test 310), or if the current fail event matches any prior fail event in TA database 358. If so, information relative to the previous fail events or operations is extracted including dates and build references. Also, if there are no such previous failures, this information is extracted as it may indicate a new issue.

At 412, data collector 352 searches test-result repository for historical test data regarding previous runs of subject test 310 to identify pass/fail trends for subject test 310. For example, data collector 352 may collect the pass/fail trends for the subject test for some predetermined duration (e.g., a week, a month, etc.) up to the time of the fail event. These trends can help the investigating engineer more clearly understand the recent history of the tests and, for example, identify if any possible environment/framework or other issues may be have caused repeated fail events. For example, if several failures have been reported in the last few days, interspersed with previous pass results, then this may suggest sporadic network and/or performance issues, and not necessarily a true product or component related issue. On the other hand, for example, if the test has been passing consistently until the most recent run, this may suggest that a recent build check-in is responsible for the fail event.

At 413, the data generated and collected from 405-412 is analyzed and evaluated against pre-determined rules 376 to provide possible (likely) cause(s) of the failure(s). In this way, if certain conditions are deemed to be true or false, an evaluation of the potential issue can then be hypothesized. The following is an example of a rule 376.

---

*IF* ISSUE IS REPEAT FAILURE = FALSE (i.e., issue is new)
*AND*
*IF* TEST FAILED YESTERDAY = FALSE (i.e., test passed yesterday)
*AND*
*IF* KEYFILE CODE CHECK-IN DATE > 1 DAY (i.e., no new code check-in has occurred in past 24 hours)
*THEN* PROBABLE CAUSE = "TEST ENV/FRAMEWK" (i.e., since this is a new failure and the test passed yesterday, but no new code check-ins were performed, it is likely that some environmental and/or test framework issue, which is external to the component code, may have caused the fail event(s))

---

At 414, TA report generator 360 generates a troubleshooting report based the data stored in TA database 358. The generated report is automatically sent to a distribution list pre-defined in TA configuration file 348. The report can contain the following information.

Component under test

Test name that has been executed

Operation(s) failed

Previous occurrence(s) of same failed operation (and so, when, and other specifics)

Pass/fail trends over the past x days

Dates that key module(s) for component were last checked into source control (eg, CVS)

Additional test system information/status

Potential cause(s) for failure(s)

Link(s) to relevant log file(s) for more information

At 415, one or more engineers may receive the report. In response, they may take corrective action. Making the above detailed information easily available to engineers, via the troubleshooting report, at the same time that they are informed of an automated test failure will greatly expedite their investigation. The automated response also increases the likelihood of a correct and initial "first-time" diagnosis. TA tool 306 relieves engineers from spending their time trying to extract relevant information manually from various, separate locations, and then performing an analysis in a manual and often excessively time-consuming fashion. The next iteration of the subject test can be used to determine whether or not the corrective action was successful. If not, rules 376 may be reconsidered and updated.

Herein, "automated" means implemented by one or more programmed computers or other machines without human intervention. Herein, a "failure event" is a detectable event indicating a test has failed. For example, a failure event can be a test component output in response to a test input that differs from the expected output. "Fail-event data" is data generated by or in the same time frame that a corresponding fail event occurred. A log file is a file in which events are recorded in association with time stamps. Fail data can include failure-event data and historical data regarding prior tests and test operations.

Herein, a "test controller" is a system for testing a test-target system and/or its software and/or hardware components. A test-target system is a system that is subject to tests or that includes components subject to tests. A first event occurring "in response to" a second event means that the occurrence of the second event is a causal factor in the occurrence of the event. "Probing" involves providing inputs to an object such as a test system or a test controller to determine whether or not the response is as expected or intended. Herein, "separate from" means "non-overlapping", e.g., not sharing components. Herein, "corresponding to" means "being at least a factor in causing".

Herein, a "system" is a set of interacting non-transitory tangible elements, wherein the elements can be, by way of example and not of limitation, mechanical components, electrical elements, atoms, physical encodings of instructions, and process segments. Herein, "process" refers to a sequence of actions resulting in or involving a physical transformation. "Storage medium" and "storage media" refer to a system including non-transitory tangible material in or on which information is or can be encoded so as to be readable by a computer. "Computer-readable" refers to storage media in which information is encoded in computer-readable form.

Herein, a "computer" is a machine defining an operating system environment and having a processor, communication devices, and non-transitory computer-readable storage media encoded with code that can be executed by the processor. Herein, a "processor" is a hardware device for executing computer-executable instructions. Herein, unless otherwise apparent from context, a functionally defined component (e.g., trouble-shooting and analysis (TA) tool, data collector, probe controller, log-file parser, analysis engine, and report generator) of a computer is a combination of hardware and software executing on that hardware to provide the defined functionality. However, in the context of code encoded on computer-readable storage media, a function ally-defined component can refer to software.

In this specification, related art is discussed for expository purposes. Related art labeled "prior art", if any, is admitted prior art. Related art not labeled "prior art" is not admitted prior art. The illustrated and other described embodiments, as well as modifications thereto and variations thereupon are within the scope of the following claims.

What is claimed is:

1. An automated process comprising:

running, by a test controller, a test of a test-target component of a test-target system, the running a test including causing known inputs to be input to the test-target component so as to yield outputs including a fail event indicating a failure on the part of the test-target component, said test controller being separate from said test-target system;

sending, by the test controller, a fail notification of the fail event to a programmed hardware trouble-shooting and analysis (TA) tool;

in response to receipt of the fail notification, collecting and parsing log files from said test controller and from said test-target system to identify test operations associated with said fail event;

in response to receipt by the TA tool of the fail notification, probing, by the TA tool, of said test controller and hardware of said test-target system so as to generate probe data for investigating potential causes of said fail event other than a fault of said test-target component for each operation identified by said parsing, checking historical data for previous fail events to which that operation corresponds;

analyzing fail data to evaluate potential causes of said fail event, said fail data including said probe data and said historical data, the probing and analyzing being performed automatically, the probing and analyzing being performed by the (TA) tool; and after the analyzing, reporting the fail event and the results of the analysis, the reporting occurring prior to any analyzing of said probe data by a human.

2. A process as recited in claim 1 wherein said test controller is separate from said test-target component.

3. A process as recited in claim 1 further comprising, in response to said fail notification, collecting file build data regarding when a file associated with said test-target component was last updated, said fail data including said file build data.

4. A process as recited in claim 1 further comprising, in response to said fail notification, collecting a pass/fail history data for said test.

5. An automated programmed hardware trouble-shooting and analysis (TA) tool for a software development system including a test controller for applying a test to at least one software component of a test-target system so as to generate pass events and fail events, the test-target system being separate from said test controller, said TA tool comprising:

at least one communications device for receiving a fail notification of at least one fail event;

a data collector configured to collect log files from said test controller and said test-target system;

a log-file parser to parse the log files to identify test operations associated with said fail event;

a probe controller configured to transmit probes to said test controller and/or said test-target system so as to generate probe data for evaluating potential causes of said fail event other than a fault of said software component a data collector that, for each operation identified by said parsing, checks historical data for previous fail events to which that operation corresponds;

an analysis engine configured to automatically analyze fail data to identify at least one cause or candidate for a cause of said fail event, said fail data including said probe data and said historical data; and a report generator coupled to said analysis engine for, after the analyzing, reporting the fail event and the results of the analysis, the reporting occurring prior to any analyzing of said probe data by a human.

6. A tool as recited in claim 5 wherein said potential causes evaluated by said probe data include a fault of said test controller that is not a fault of said test-target system.

7. A trouble-shooting and analysis (TA) tool as recited in claim 5 further comprising a database for storing, accessing, and managing data representing historical relations between said test operations and said failure events.

8. A trouble-shooting and analysis (TA) tool as recited in claim 5 wherein said data collector is further configured to access a test repository to obtain historical data regarding pass and fail performances of prior runs of said test.

9. A system comprising non-transitory computer-readable storage media encoded with code configured to, when executed by a processor, implement a process including:

running, by a test controller, a test of a test-target component of a test-target system, the running a test including causing known inputs to be input to the test-target component so as to yield outputs including a fail event indicating a failure on the part of the test-target component, said test controller being separate from said test-target system;

sending, by the test controller, a fail notification of the fail event to a programmed hardware trouble-shooting and analysis (TA) tool;

in response to receipt of the fail notification, collecting and parsing log files from said test controller and from said test-target system to identify test operations associated with said fail event;

in response to receipt by the TA tool of the fail notification, probing, by the TA tool, of said test controller and hardware of said test-target system so as to generate probe data for investigating potential causes of said fail event other than a fault of said test-target component;

for each operation identified by said parsing, checking historical data for previous fail events to which that operation corresponds;

analyzing fail data to evaluate potential causes of said fail event, said fail data including said probe data and said historical data, the probing and analyzing being performed automatically, the probing and analyzing being performed by the (TA) tool; and after the analyzing, reporting the fail event and the results of the analysis, the reporting occurring prior to any analyzing of said probe data by a human.

10. A system as recited in claim 9 further comprising said processor.

11. A system as recited in claim 9 wherein said process further includes collecting said historical data relating said test operations to fail events occurring during previous runs of said test.

12. A system as recited in claim 11 wherein said process further includes collecting historical data regarding successes and failures of previous instances of said test.

13. A system as recited in claim 9 wherein said reporting occurs no later than any other reporting to a human of the fail event.

* * * * *

UNITED STATES PATENT AND TRADEMARK OFFICE

CERTIFICATE OF CORRECTION

PATENT NO. : 8,935,676 B2
APPLICATION NO. : 13/204691
DATED : January 13, 2015
INVENTOR(S) : Guy Verbest It is certified that error appears in the above-identified patent and that said Letters Patent is hereby corrected as shown below:

In the Claims

In column 8, line 21, in Claim 6, delete “tool” and insert -- trouble-shooting and analysis (TA) tool --, therefor.

Signed and Sealed this
Twenty-sixth Day of May, 2015

Michelle K. Lee
*Director of the United States Patent and Trademark Office*